United States Patent Office 3,049,500
Patented Aug. 14, 1962

3,049,500
PROCESS OF INCREASING THE PARTICLE SIZE OF SYNTHETIC LATEX COMPRISING ADDING POLYVINYL METHYL ETHER TO A LATEX CONTAINING SALT ELECTROLYTE
Louis H. Howland, Watertown, Victor S. Chambers, Naugatuck, and Edmund J. Aleksa, Southbury, Conn., assignors to United States Rubber Company, New York, N.Y., a corporation of New Jersey
No Drawing. Filed Jan. 28, 1960, Ser. No. 5,097
18 Claims. (Cl. 260—17.4)

This invention relates to increasing the particle size of synthetic rubber latices, and particularly to permit them to be concentrated to fluid latices of high solids content.

We have found that the particle size of a synthetic rubber latex may be greatly increased by the addition to the latex of polyvinyl methyl ether in the presence of an alkali salt electrolyte. Such latices to which polyvinyl methyl ether has been added may readily be concentrated, preferably by evaporation concentration, to fluid high solids latices.

In carrying out the present invention, there is added to a synthetic rubber latex a small amount of polyvinyl methyl ether in the presence of 0.2% to 2%, based on the solids of the latex, of an alkali salt electrolyte. Such alkali salt electrolyte may be an alkali (potassium, sodium, ammonium or amine) salt of an acid such as carbonic, formic, acetic, sulfuric, hydrochloric, nitric or phosphoric acids. Examples of alkali salt electrolytes that may be used in the present invention are ammonium carbonate, ammonium bicarbonate, methyl amine carbonate, dimethyl amine carbonate, sodium formate, potassium acetate, sodium sulfate, potassium sulfate, sodium chloride, potassium chloride, sodium nitrate, and trisodium phosphate. Such alkali salt electrolyte may be present in the latex from the polymerization recipe or may be added with or after the polyvinyl methyl ether, or may in part be present from the polymerization recipe and in part be added with or after the polyvinyl methyl ether. Such 0.2% to 2% alkali salt electrolyte is in addition to the very small amounts of electrolyte that may be present in the latex from the catalysts, activators, sequestering agents, oxygen scavengers, emulsifiers and stabilizers from the polymerization recipe. The latex will conventionally have a solids content of 20% to 50%, and after the addition of the polyvinyl methyl ether, the particle size of the latex will be increased and the latex may readily be concentrated to a solids content of 55% to 70%, giving a fluid high solids latex. The latex may be concentrated by increasing the solids content in known manner as by creaming with a vegetable mucilage, such as ammonium alginate. It is preferred, however, to increase the solids content by evaporation concentration. The temperature of treatment of the latex according to the present invention will generally be in the range from 0° C. to 100° C. The average particle diameter of latices to be treated according to the present invention may be from 500 to 1500 Angstrom units, and the average particle diameter of these latices may be increased by 200 to 2500 Angstrom units by the process of the present invention.

Polyvinyl methyl ethers are generally graded by specific viscosity, which is a measure of average molecular weight. Polyvinyl methyl ethers having a specific viscosity from 0.015 to 1.1, which corresponds to average molecular weights in the range from 160 to 6000, may be used in the present invention. The preferred polyvinyl methyl ethers are those having specific viscosities between 0.1 and 1.1, which corresponds to molecular weights in the range from 4000 to 6000. The amount of polyvinyl methyl ether is not critical and may be up to 1 part per 100 parts of latex solids. The preferred range is 0.01 to 0.5 part of polyvinyl methyl ether per 100 parts of latex solids.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex." The latices will contain dispersing agents from the polmerization generally in amount from 2% to 10% by weight of the solids of the latex of one or a mixture of anionic surface-active dispersing agents. Such anionic surface-active dispersing agents may be water-soluble soaps of soap-forming monocarboxylic acids, such as alkali-metal, ammonium or amine salts of higher fatty acids having 10 to 24 carbon atoms in the molecule or of rosin acids, including hydrogenated, dehydrogenated and disproportionated rosin acids. The anionic surface-active dispersing agents may be sulfonated or sulfated compounds having the general formula R—$SO_3M$ of R—$OSO_3M$, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinates; aryl sulfonate-formaldehyde condensation products, e.g. condensation product of sodium naphthalene sulfonate and formaldehyde.

The following examples illustrate the invention. All parts and percentages referred to herein are by weight.

*Example 1*

The latex used in this example was prepared by polymerizing for seven hours at 41° F. to 80% conversion a recipe consisting of 150 parts of water, 70 parts of butadiene-1,3, 30 parts of styrene, 3.25 parts of potassium oleate, 1.75 parts of potassium disproportionated rosin soap, 0.5 part of the condensation product of sodium naphthalene sulfonate and formaldehyde, 0.2 part of diisopropyl benzene hydroperoxide, 0.1 part of sodium formaldehyde sulfoxylate, 0.02 part of ferrous sulfate heptahydrate, 0.08 part of the tetrasodium salt of ethylene diamine tetraacetic acid, 0.03 part of sodium dithionite, and 0.1 part of tertiary dodecyl mercaptan. After polymerization, residual butadiene was vented off and residual styrene was removed by steam distillation. The solids content of the latex was 31.4% and the average particle diameter was 640 Angstrom units.

To five 960 gm. samples A, B, C, D and E of the latex were added various amounts of potassium sulfate as a 10% aqueous solution and various amounts (as a 1% aqueous solution) of a polyvinyl methyl ether (PVM) having a specific viscosity of about 0.4. The latices were concentrated in a laboratory disc concentrator at 35° C. to 40° C. to as high solids content as possible. The amounts of potassium sulfate and polyvinyl methyl ether added to samples A, B, C, D and E (as parts per 100 parts of latex solids), and the average particle diameter and solids content and viscosity and surface tension of the concentrates are shown in the following table. The viscosity measurements in all the examples were made at 25° C.

| Sample | Added Potassium Sulfate | Added PVM | Ave. Particle Diameter (Angstrom Units) | Solids Content (Percent) | Viscosity (Centipoises) | Surface Tension (Dynes per cm.) |
| --- | --- | --- | --- | --- | --- | --- |
| A | None | None | 660 | 43.6 | 8,070 | 62.9 |
| B | None | 0.25 | 640 | 44.4 | 10,000 | 63.1 |
| C | None | 1.0 | 690 | 46.2 | 10,000 | 63.0 |
| D | 1.0 | None | 820 | 51.2 | 8,360 | 63.0 |
| E | 0.5 | 0.25 | 2,400 | 62.2 | 3,090 | 43.2 |

Comparison of samples B and C with sample A shows that untreated polyvinyl methyl ether of itself, that is in the absence of alkali salt electrolyte, does not increase the particle size of the latex. The greater increase in particle size of the latex with the polyvinyl methyl ether in the presence of alkali salt electrolyte in sample E over the increase in particle size of the latex in the presence of the alkali salt electrolyte alone in sample D is clearly a synergistic effect.

*Example 2*

The latex used in this example was prepared by polymerizing for 20 hours at 41° F. to 80% conversion a recipe consisting of 150 parts of water, 70 parts of butadiene-1,3, 30 parts of styrene, 3.25 parts of potassium oleate, 1.75 parts of potassium disproportionated rosin soap, 0.5 part of the condensation product of sodium naphthalene sulfonate and formaldehyde, 1.5 parts of potassium sulfate, 0.1 part of diisopropyl benzene hydroperoxide, 0.1 part of sodium formaldehyde sulfoxylate, 0.04 part of ferrous sulfate heptahydrate, 0.16 part of the tetrasodium salt of ethylene diamine tetraacetic acid, 0.03 part of sodium dithionite, and 0.07 part of tertiary dodecyl mercaptan. After removing residual monomers, the solids content of the latex was 33.5% and the average particle diameter was 770 Angstrom units. The latex was concentrated in a laboratory disc concentrator at 40° C. to 45° C. to 44.8% solids content. The average particle diameter of the latex was 770 Angstrom units.

To a portion of this 44.8% solids content latex was added 0.15 part per 100 parts of latex solids of polyvinyl methyl ether (specific viscosity 0.28) as a 10% aqueous solution. Portions of the untreated 44.8% solids content latex and the latex to which the polyvinyl methyl ether had been added were heated at 93° C. for one hour. The average particle diameter of the heated latex to which the polyvinyl methyl ether had been added was 1330 Angstrom units whereas the average particle diameter of the heated latex to which polyvinyl methyl ether had not been added was 800 Angstrom units.

The thus treated latex portions were concentrated to a viscosity of about 4000 centipoises. The concentrated latex to which the polyvinyl methyl ether had been added had an average particle diameter of 1370 Angstrom units and a solids content of 61.8% at a viscosity of 4160 centipoises. The concentrated latex to which polyvinyl methyl ether had not been added had an average particle diameter of 820 Angstrom units and a solids content of only 53.4% at a viscosity of 4110 centipoises.

*Example 3*

The latex used in this example was prepared by polymerizing for 15¾ hours at 41° F. to 80% conversion a recipe consisting of 150 parts of water, 70 parts of butadiene-1,3, 30 parts of styrene, 3.25 parts of potassium oleate, 1.75 parts of potassium disproportionated rosin soap, 0.5 part of the condensation product of sodium naphthalene sulfonate and formaldehyde, 0.5 part of potassium sulfate, 0.2 part of diisopropyl benzene hydroperoxide, 0.1 part of sodium formaldehyde sulfoxylate, 0.02 part of ferrous sulfate heptahydrate, 0.08 part of the tetrasodium salt of ethylene diamine tetraacetic acid, 0.03 part of sodium dithionite, and 0.1 part of tertiary dodecyl mercaptan. After removing residual monomers, the solids content of the latex was 36.5% and the average particle diameter was 750 Angstrom units.

To a portion of the latex was added 0.3 part of polyvinyl methyl ether (specific viscosity 0.28) per 100 parts of latex solids as a 1% aqueous solution. Portions of the untreated latex and the latex to which the polyvinyl methyl ether were added were concentrated in a laboratory disc concentrator at 40° C. to 45° C.

The latex to which no polyvinyl methyl ether was added was concentrated to 52.2% solids content. The latex had a viscosity of 6990 centipoises and an average particle diameter of 750 Angstrom units. The latex to which the polyvinyl methyl ether had been added was concentrated to 55.0% solids content. The latex had a viscosity of 6470 centipoises and an average particle diameter of 1500 Angstrom units.

*Example 4*

A 38.6% solids content latex of a synthetic rubber copolymer of 50 parts of butadiene-1,3 and 50 parts of styrene containing 4.5 parts of potassium oleate soap and 2.1 parts of potassium disproportionated rosin soap dispersing agents and 0.1 part of a dispersing agent which was the condensation product of sodium naphthalene sulfonate and formaldehyde and 0.6 part of potassium sulfate per 100 parts of latex solids and having a pH of 10.2 and an average particle diameter of 640 Angstrom units was used in this example.

To two 777 gm. samples of the latex were added 2 parts per 100 parts of latex solids of a dispersing agent which was the condensation product of sodium naphthalene sulfonate and formaldehyde as a 20% aqueous solution, and 5 parts per 100 parts of latex solids of ammonium bicarbonate as a 20% aqueous solution. Sample A was not otherwise compounded. To sample B was added 0.1 part per 100 parts of latex solids of polyvinyl methyl ether (specific viscosity about 0.4) as a 5% aqueous solution. The average particle diameters of the thus treated samples A and B were 960 and 1760 Angstrom units respectively, showing the great increase in particle size enlargement by addition of the polyvinyl methyl ether in the presence of the alkali salt electrolyte. The thus treated samples A and B were concentrated by evaporation concentration in a laboratory disc concentrator at 35° C. to 40° C. Sample A was concentrated to 58% solids content with a viscosity of 1580 centipoises. Sample B was concentrated to a solids content of 69% with a viscosity of 860 centipoises.

*Example 5*

A 34.4% solids content latex of a synthetic rubber copolymer of 70 parts of butadiene-1,3 and 30 parts of styrene containing 3.8 parts of potassium oleate soap dispersing agent and 0.6 part of a dispersing agent which was the condensation product of sodium naphthalene sulfonate and formaldehyde and 0.6 part of potassium sulfate per 100 parts of latex solids and having a pH of 9.7 and an average particle diameter of 680 Angstrom units was used in this example.

To four 870 gm. samples of the latex were added 2 parts per 100 parts of latex solids of a dispersing agent which was the condensation product of sodium naphthalene and formaldehyde as a 20% aqueous solution, and 0.1 part of polyvinyl methyl ether (specific viscosity about 0.62) as a 5% aqueous solution, and various amounts of ammonium bicarbonate as a 20% aqueous solution. The amounts of ammonium bicarbonate was 2, 3, 4 and 5 parts per 100 parts of latex solids for samples A, B, C and D respectively. The average particle diameters of the thus treated latices were 880, 1020, 1040 and 1340 Angstrom units for samples A, B, C and D respectively. The treated samples A, B, C and D were evaporation concentrated in a laboratory disc concentrator at 35° C. to 40° C. to approximately 60% solids. The average particle diameters of the concentrated latices were 1160, 1300, 1320 and 1520 Angstrom units for samples A, B, C and D respectively.

*Example 6*

A 35.4% solids content latex of a synthetic rubber copolymer of 70 parts of butadiene-1,3 and 30 parts of styrene containing 3.8 parts of potassium oleate soap dispersing agent and 0.6 part of a dispersing agent which was the condensation product of sodium naphthalene sulfonate and 0.6 part of potassium sulfate per 100 parts of latex solids and having a pH of 9.8 and an average particle diameter of 680 Angstrom units was used in this example.

To six 857 gm. samples A, B, C, D, E and F of the latex were added various amounts of potassium sulfate as a 10% aqueous solution and various amounts (as a 10% aqueous solution) of a polyvinyl methyl ether (PVM) having a specific viscosity of 0.95. After standing at room temperature for one-half hour, the latices were concentrated in a laboratory disc concentrator at about 60° C. The amounts of potassium sulfate and polyvinyl methyl ether added to samples A, B, C, D, E and F (as parts per 100 parts of latex solids), and the average particle diameter and solids content and viscosity of the concentrates are shown in the following table:

| Sample | Added Potassium Sulfate | Added PVM | Average Particle Diameter (Angstrom Units) | Solids Content (Percent) | Viscosity (Centipoises) |
|---|---|---|---|---|---|
| A | 1 | None | 880 | 52 | 1,370 |
| B | 0.5 | 0.25 | 2,120 | 59 | 675 |
| C | 0.5 | 0.50 | 2,120 | 66 | 1,125 |
| D | 1 | 0.50 | 2,240 | 71 | 2,000 |
| E | 1.5 | 0.50 | 2,160 | 66 | 500 |
| F | 1 | 0.75 | 2,020 | 70 | 2,630 |

*Example 7*

A 35.0% solids content latex of a copolymer of 70 parts of butadiene-1,3 and 30 parts of styrene containing 4.1 parts of potassium oleate soap and 2.2 parts of potassium disproportionated rosin soap dispersing agents and 0.1 part of a dispersing agent which was the condensation product of sodium naphthalene sulfonate and formaldehyde and 0.6 part of potassium sulfate per 100 parts of latex solids and having a pH of 9.8 and an average particle diameter of 640 Angstrom units was used in this example.

An 857 gm. portion of the latex, which had a surface tension of 62.8 dynes per centimeter was placed in a laboratory disc concentrator and concentrated at 55° C. to 60° C. After one-half hour concentration its surface tension was 63.0 dynes per centimeter and its solids was 39.1%. After one hour concentration its surface tension was 62.9 dynes per centimeter and its solids was 42.3%. At the end of one hour and 15 minutes its surface tension was 63.0 dynes per centimeter and its solids was 46.4%. The latex was then removed from the concentrator. The viscosity of the concentrated latex was 5410 centipoises.

To a second 857 gm. portion of the latex was added 1 part of sodium sulfate per 100 parts of latex solids as a 10% aqueous solution. The treated latex had a surface tension of 62.8 dynes per centimeter. It was placed in a laboratory disc concentrator and concentrated at 55° C. to 60° C. After one-half hour its surface tension was 63.0 dynes per centimeter and its solids was 49.0%. At the end of one hour its surface tension was 59.3 dynes per centimeter and its solids was 53.5%. It was then removed from the concentrator. The viscosity of the concentrated latex was 8110 centipoises.

To a third 857 gm. portion of the latex was added 1 part of sodium sulfate per 100 parts of latex solids as a 10% aqueous solution and 0.5 part of polyvinyl methyl ether (specific viscosity about 0.28) per 100 parts of latex solids as a 10% aqueous solution. The treated latex had a surface tension of 64.2 dynes per centimeter. It was held at room temperature for one-half hour. Its surface tension was then 63.6 dynes per centimeter. The latex was then placed in a laboratory disc concentrator and concentrated at 55° C. to 60° C. After one-half hour concentration its surface tension was 62.4 dynes per centimeter and its solids had increased from approximately 33.8% to 39.9%. After one hour concentration its surface tension was 50.2 dynes per centimeter and its solids was 52.8%. At the end of one and one-half hours the surface tension of the latex had fallen to 36.6 dynes per centimeter and its solids was 69.8%. The latex was then removed from the concentrator. The viscosity of the concentrated latex was 2800 centipoises.

The surface tension is a measure of the progress of the enlargement of particle size, as the particle size increases the surface tension falls. Presumably this decrease in surface tension is caused by soap that is released from the particle surface as the small particles agglomerate to give larger ones thus decreasing the particle surface area. The above measurements show that the particle size increases prior to concentration and also during concentration according to the present invention.

*Example 8*

A 33.4% solids content latex of a copolymer of 70 parts of butadiene-1,3 and 30 parts of styrene containing 4.1 parts of potassium oleate soap and 2.2 parts of potassium disproportionated rosin soap dispersing agents and 0.6 part of a dispersing agent which was the condensation product of sodium naphthalene sulfonate and formaldehyde and 0.6 part of potassium sulfate per 100 parts of latex solids and having a pH of 9.9 and an average particle diameter of 640 Angstrom units was used in this example.

To 3,155 pounds of the latex was added with stirring a solution of 2.125 pounds (0.2 part per hundred parts of latex solids) of polyvinyl methyl ether (specific viscosity about 0.28) in about 20 pounds of water. A solution of 4.25 pounds (0.4 part per hundred parts of latex solids) of potassium sulfate and 20.1 pounds (1.9 parts per hundred parts of latex solids) of the condensation product of sodium naphthalene sulfonate and formaldehyde dispersing agent in 66.4 pounds of water was then added and stirred in. The latex was then concentrated under vacuum to 63.3% solids in a large closed vessel while pumping the latex through a plate heat exchanger with an exit temperature of about 75° C. to 80° C. The temperature of the latex in the evacuated vessel was about 57° C. The concentrated latex had an average particle diameter of 1930 Angstrom units and a viscosity of approximately 300 centipoises.

The latices of increased particle size according to the present invention, particularly of high solids content, may be used in the usual applications of latices, as in foam sponge manufacture, tire cord dipping, bonding and impregnating various materials, preparation of adhesives, and the like.

This application is a continuation-in-part of our applications Serial Nos. 776,668 and 776,762, filed November 28, 1958.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2{=}C{<}$ group are copolymerizable with butadienes-1,3 which comprises incorporating in the latex up to 1% of polyvinyl methyl ether having a specific viscosity from 0.015 to 1.1 and 0.2% to 2% of an alkali salt electrolyte selected from the group consisting of sodium, potassium, ammonium and amine salts, said percentages being based on the solids of the latex.

2. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2{=}C{<}$ group and are copolymerizable with butadienes-1,3 which comprises adding to the latex 0.01% to 0.5% of polyvinyl methyl ether having a specific viscosity from 0.015 to 1.1 in the presence of 0.2% to 2% of an alkali salt electrolyte selected from the group consisting of sodium, potassium, ammonium and amine salts, said percentages being based on the solids of the latex.

3. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2{=}C{<}$ group and are copolymerizable with butadienes-1,3 containing 0.2% to 2% of an alkali salt electrolyte selected from the group consisting of sodium, potassium, ammonium and amine salts which comprises adding to said latex up to 1% of polyvinyl methyl ether having a specific viscosity from 0.015 to 1.1, said percentages being based on the solids of the latex.

4. The method of increasing the size of the dispersed polymer particles in a synthetic rubber latex of a copolymer of butadiene-1,3 and styrene which comprises incorporating in the latex 0.01% to 0.5% of polyvinyl methyl ether having a specific viscosity from 0.015 to 1.1 and 0.2% to 2% of an alkali salt electrolyte selected from the group consisting of sodium, potassium, ammonium and amine salts, said percentages being based on the solids of the latex.

5. The method of increasing the size of the dispersed polymer particles in a synthetic rubber latex of a copolymer of butadiene-1,3 and styrene which comprises adding to the latex up to 1% of polyvinyl methyl ether having a specific viscosity from 0.015 to 1.1 in the presence of 0.2% to 2% of an alkali salt electrolyte selected from the group consisting of sodium, potassium, ammonium and amine salts, said percentages being based on the solids of the latex.

6. The method of increasing the size of the dispersed polymer particles in a synthetic rubber latex of a copolymer of butadiene-1,3 and styrene containing 0.2% to 2% of an alkali salt electrolyte selected from the group consisting of sodium, potassium, ammonium and amine salts which comprises adding to said latex 0.01% to 0.5% of polyvinyl methyl ether having a specific viscosity from 0.015 to 1.1, said percentages being based on the solids of the latex.

7. The method of increasing the size of the dispersed polymer particles in a synthetic rubber latex of a copolymer of butadiene-1,3 and styrene which comprises incorporating in the latex up to 1% of polyvinyl methyl ether having a specific viscosity from 0.015 to 1.1 and 0.2% to 2% of potassium sulfate, said percentages being based on the solids of the latex.

8. The method of increasing the size of the dispersed polymer particles in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2{=}C{<}$ group and are copolymerizable with butadienes-1,3 which comprises adding to the latex 0.01% to 0.5% of polyvinyl methyl ether having a specific viscosity from 0.015 to 1.1 in the presence of 0.2% to 2% of potassium sulfate, said percentages being based on the solids of the latex.

9. The method of increasing the size of the dispersed polymer particles in a synthetic rubber latex of a copolymer of butadiene-1,3 and styrene containing 0.2% to 2% of potassium sulfate which comprises adding to said latex up to 1% of polyvinyl methyl ether having a specific viscosity from 0.015 to 1.1, said percentages being based on the solids of the latex.

10. The method of making a concentrated latex which comprises incorporating in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2{=}C{<}$ group and are copolymerizable with butadienes-1,3 having a solids content of 20% to 50%, from 0.01% to 0.5% of polyvinyl methyl ether having a specific viscosity of 0.015 to 1.1, and from 0.2% to 2% of an alkali salt electrolyte selected from the group consisting of sodium, potassium, ammonium and amine salts, said percentages being based on the weight of solids of the latex, and then increasing the solids content of the latex to within the range of 55% to 70% by creaming with a vegetable mucilage.

11. The method of making a concentrated latex which comprises adding to a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2{=}C{<}$ group and are copolymerizable with butadienes-1,3 having a solids content of 20% to 50%, up to 1% of polyvinyl methyl ether having a specific viscosity of 0.015 to 1.1 in the presence of 0.2% to 2% of an alkali salt electrolyte selected from the group consisting of sodium, potassium, ammonium and amine salts, said percentages being based on the weight of solids of the latex, and then evaporating water from the latex until the latex is concentrated to a solids content of 55% to 70%.

12. The method of making a concentrated latex which comprises adding to a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2{=}C{<}$ group and are copolymerizable with butadienes-1,3 having a solids content of 20% to 50% and containing 0.2% to 2% of an alkali salt electrolyte selected from the group consisting of sodium, potassium, ammonium and amine salts from 0.01% to 0.5% of polyvinyl methyl ether having a specific viscosity of 0.015 to 1.1, said percentages being based on the weight of solids of the latex, and then increasing the solids content of the latex to within the range of 55% to 70% by creaming with a vegetable mucilage.

13. The method of making a concentrated latex which comprises incorporating in a synthetic rubber latex of a copolymer of butadiene and styrene having a solids content of 20% to 50%, up to 1% of polyvinyl methyl ether having a specific viscosity of 0.015 to 1.1, and from 0.2% to 2% of an alkali salt electrolyte selected from the group consisting of sodium, potassium, ammonium and amine salts, said percentages being based on the weight of solids of the latex, and then evaporating water from the latex until the latex is concentrated to a solids content of 55% to 70%.

14. The method of making a concentrated latex which comprises adding to a synthetic rubber latex of a copolymer of butadiene-1,3 and styrene having a solids content of 20% to 50%, from 0.01% to 0.5% of polyvinyl methyl ether having a specific viscosity of 0.015 to 1.1 in the presence of 0.2% to 2% of an alkali salt electrolyte selected from the group consisting of sodium, potassium, ammonium and amine salts, said percentages being based on the weight of solids of the latex, and then increasing the solids content of the latex to within the range of 55% to 70% by creaming with a vegetable mucilage.

15. The method of making a concentrated latex which comprises adding to a synthetic rubber latex of a copolymer of butadiene-1,3 and styrene having a solids content of 20% to 50% and containing 0.2% to 2% of an alkali salt electrolyte selected from the group consisting of sodium, potassium, ammonium and amine salts, up to 1% of polyvinyl methyl ether having a specific viscosity of 0.015 to 1.1, said percentages being based on the weight of solids of the latex, and then evaporating water from the latex until the latex is concentrated to a solids content of 55% to 70%.

16. The method of making a concentrated latex which comprises incorporating in a synthetic rubber latex aqueous emulsion polymerizate of material selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 having a solids content of 20% to 50%, from 0.01% to 0.5% of polyvinyl methyl ether having a specific viscosity of 0.015 to 1.1, and from 0.2% to 2% of potassium sulfate, said percentages being based on the weight of solids of the latex, and then increasing the solids content of the latex to within the range of 55% to 70% by creaming with a vegetable mucilage.

17. The method of making a concentrated latex which comprises adding to a synthetic rubber latex of a copolymer of butadiene-1,3 and styrene having a solids content of 20% to 50%, up to 1% of polyvinyl methyl ether having a specific viscosity of 0.015 to 1.1 in the presence of 0.2% to 2% of potassium sulfate, said percentages being based on the weight of solids of the latex, and then evaporating water from the latex until the latex is concentrated to a solids content of 55% to 70%.

18. The method of making a concentrated latex which comprises adding to a synthetic rubber latex of a copolymer of butadiene-1,3 and styrene having a solids content of 20% to 50% and containing 0.2% to 2% of potassium sulfate, from 0.01% to 1% of polyvinyl methyl ether having a specific viscosity of 0.015 to 1.1, said percentages being based on the weight of solids of the latex, and then evaporating water from the latex until the latex is concentrated to a solids content of 55% to 70%.

References Cited in the file of this patent
UNITED STATES PATENTS

| | | |
|---|---|---|
| 2,138,073 | Schweitzer | Nov. 29, 1938 |
| 2,444,801 | Arundale | July 6, 1948 |